Figure 1:
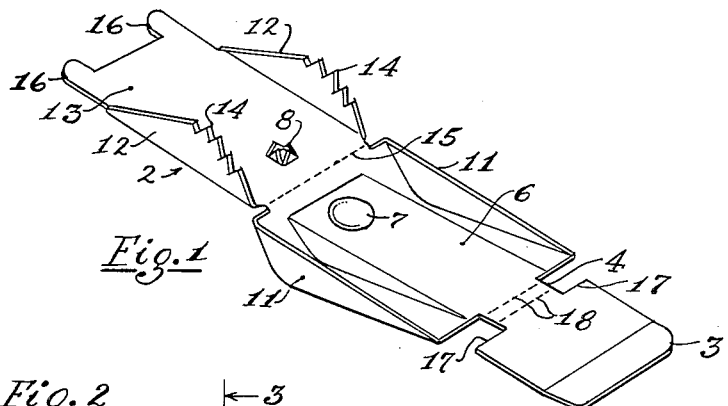

July 12, 1955 W. STELZER 2,712,958
CORD SEAL
Filed Oct. 22, 1952

INVENTOR.
William Stelzer

United States Patent Office 2,712,958
Patented July 12, 1955

2,712,958

CORD SEAL

William Stelzer, Summit, N. J., assignor to Stoffel Seals Corporation, Tuckahoe, N. Y.

Application October 22, 1952, Serial No. 316,293

3 Claims. (Cl. 292—325)

The invention relates to cord seals and more particularly to a tamperproof fold-type seal attachable to a cord or other tensile member where the portions of the seal to be folded are weakened to break off when the seal is opened again after having been once closed.

The object of the invention is to provide a seal that is more tamperproof than present seals of this class, where the cord is gripped more firmly and where access to the interior of the closed seal is more difficult.

Another object is to devise a seal that is capable of gripping cords of different thickness with equal security, and where the force required to close the seal is as small as possible.

Figure 2:
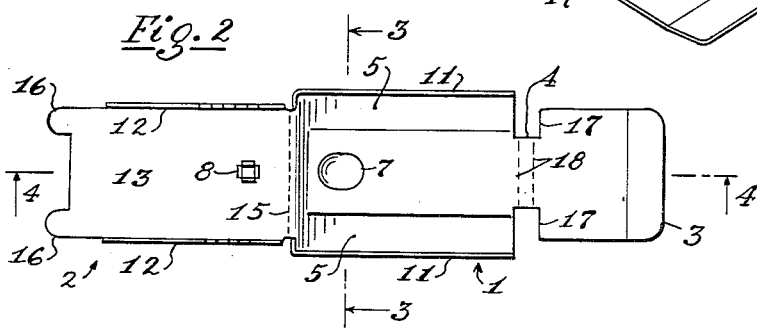
Figure 3:
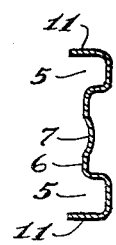
Figure 4:
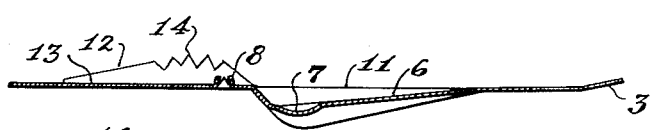
Figure 5:
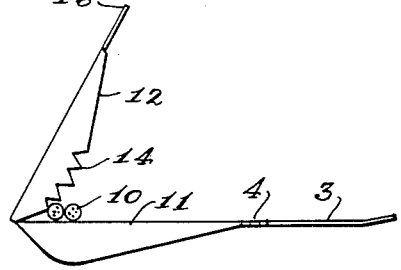
Figure 6:
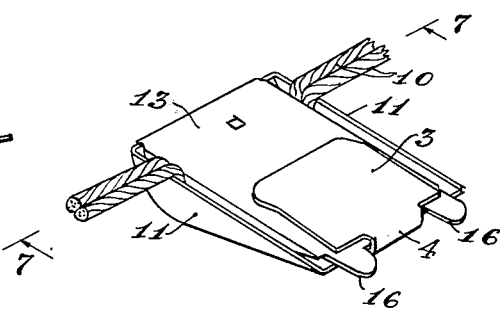

Other objects and advantages of this invention will be apparent from the following detailed description considered in connection with the accompanying drawing submitted for the purpose of illustration and not to define the scope of the invention, reference being had for that purpose to the subjoined claims. In the drawing, wherein similar reference characters refer to similar parts throughout the several views:

Fig. 1 is a perspective view of an open seal;

Fig. 2 a plan view of the improved seal, showing the inside surfaces;

Fig. 3, a section taken on line 3—3 of Fig. 2;

Fig. 4, a section taken on line 4—4 of Fig. 2;

Fig. 5, a side view of the same seal shown in a partly closed position;

Fig. 6, a perspective view of the closed seal attached to cords; and

Figure 7:
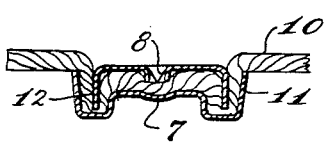

Fig. 7, a section taken on lines 7—7 of Fig. 6 to show the manner in which the cord is held.

Before explaining the present invention in detail, it is to be understood that the invention is not limited in its application to the details of construction and arrangement of parts illustrated in the accompanying drawing, since the invention is capable of other embodiments and of being practised or carried out in various ways. Also it is to be understood that the phraseology or terminology employed herein is for the purpose of description and not limitation.

The novel seal is manufactured and supplied to the user in the form shown in Figs. 1–4 or partly closed as shown in Fig. 5. It is stamped of a single piece of sheet material, preferably metal, comprising a recessed main portion indicated in general by numeral 1, a cover or flap, indicated in general by numeral 2, extending from one end of the recessed main portion 1 and foldable against the latter, and a locking lug 3 having a narrow section or neck 4 extending from the other end of main portion 1. The latter is drawn or recessed to provide a pair of parallel recesses or cavities 5 into which the cord to which the seal is to be attached is pressed. The central portion 6 is depressed only slightly and has a special depression or indentation 7 to accommodate burrs 8 pressed out of the plane of flap 2, these burrs being intended to grip the cord members more firmly and to press them into depression 7 when the seal is closed, as illustrated in Fig. 7 where the cord members are indicated by numeral 10. The cavities 5 as shown have the greatest depth at the section near where the cord members are to be held, the depth decreasing towards the ends. The side walls 11 thus are firmly supported so that it is quite impossible to bend them outwardly without destroying them when tampering is attempted. Flap 2 has side walls 12 bent at right angles to the general plane 13 of flap 2 and provided with teeth 14 which grip the cord firmly and also prevent the latter from being pushed endwise of the seal when tampering is attempted. Furthermore these teeth reach into the cavities 5 of main portion 1 so that it is impossible to push or bend side flanges 12 against plane 13 after the seal is once closed. A weakened line or score marks 15 provide a hinge or bending line about which flap 2 can be folded against main portion 1 to form a capsule or case containing the cord or attaching element 10. The outer end of flap 2 has a pair of spaced extensions 16 of such lengths that when flap 2 is folded about line 15 against main portion 1, the outer extremities of extensions 16 approach shoulders 17 of lug 3 but do not reach beyond them so that lug 3 can be folded about scored lines 18 over flap 2 after the latter is closed; the closed position being shown in Fig. 6. Thus after lug 3 is bent over, the seal is securely locked. It is apparent that if the distances between line 15 and the end of extensions 16 and between line 15 and shoulders 17 are held accurate, the seal becomes locked as soon as lug 3 is bent to some degree. The desired accuracy in the present design is possible because the main body portion 1 and flap 2 are stiffened longitudinally by side walls 11 and 12 respectively so that bending or distortion and consequent change in length are prevented. The security of the seal depends mainly on the dependability of score lines 18. The material must be scored to such a depth that permits bending of lug 3 against flap 2 without breaking off but provides definite breakage after lug 3 is bent away from flap 2 and before shoulders 17 clear extensions 16, this principle being well known and having been used successfully in the art. The contribution to the art in this respect lies in the longitudinal reinforcements represented by side walls 11 and 12 which help to maintain the proper relation between extensions 16 and shoulders 17 so that in breaking the seal, lug 3 has to be opened the maximum distance to assure breakage on one of weakened lines 18.

According to Fig. 5 the seal may be supplied to the user in a partly closed position where flap 2 is bent to extend angularly from main portion 1 and where flap 2 is closed to such an extent that when the cords 10 are fully placed, or as far as they go into the jaw formed by flap 2 and main portion 1, they are located near or at the deepest section of cavities 5, so that definite locating means are provided for the most desirable location of the cords 10, where the latter are fully gripped by teeth 14 and where the maximum offset of the cords in the closed seal is obtained, the offset or zigzag position of the cords being illustrated in Fig. 7.

Having thus described my invention, I claim:

1. A cord seal formed of a single piece of sheet metal comprising a main portion having side walls, a pair of spaced longitudinally disposed cavities tapering off in depth towards their ends, each being adjacent to one of said side walls, a flap having toothed side flanges joining one end of said main portion, a score line at the juncture of said flap and said main portion so that said flap is foldable about said score line against said main portion whereby said toothed side flanges enter into said cavities, the deepest portions of said cavities being located near said juncture, a lug extending from the other and opposite end of said main portion, a narrow neck intermediate said main portion and said lug, said neck being weakened along transverse lines across said neck so that said lug is foldable about said lines against said body portion, and a pair of spaced extensions on said flap to accommodate said neck therebetween when said flap and lug are folded against said main portion.

2. The construction as claimed in claim 1, a separate indentation in said main portion intermediate said cavities, and burrs pressed out of the plane of said flap at a place in line with said indentation to enter thereinto when said flap is folded against said main portion.

3. The construction as claimed in claim 1, wherein said flap is bent towards said main portion a certain distance to form an acute angle therewith whereby said side flanges of said flap serve as a stop for the placement of cord members to which said seal is to be secured, said cord members being spaced a desired distance from said juncture of said main portion and said flap.

References Cited in the file of this patent

UNITED STATES PATENTS

| | | |
|---|---|---|
| 1,067,081 | Treude | July 8, 1913 |
| 1,453,268 | Brooks | May 1, 1923 |
| 1,738,252 | Keidel | Dec. 3, 1929 |
| 1,932,101 | Dietze | Oct. 24, 1933 |
| 2,246,572 | Canter | June 24, 1941 |
| 2,465,349 | Brooks | Mar. 29, 1949 |

FOREIGN PATENTS

| | | |
|---|---|---|
| 395,533 | France | Jan. 4, 1909 |